Mar. 3, 1925.
N. L. LAVERS
1,528,621
COLOR SAMPLE BOOK
Filed April 5, 1923
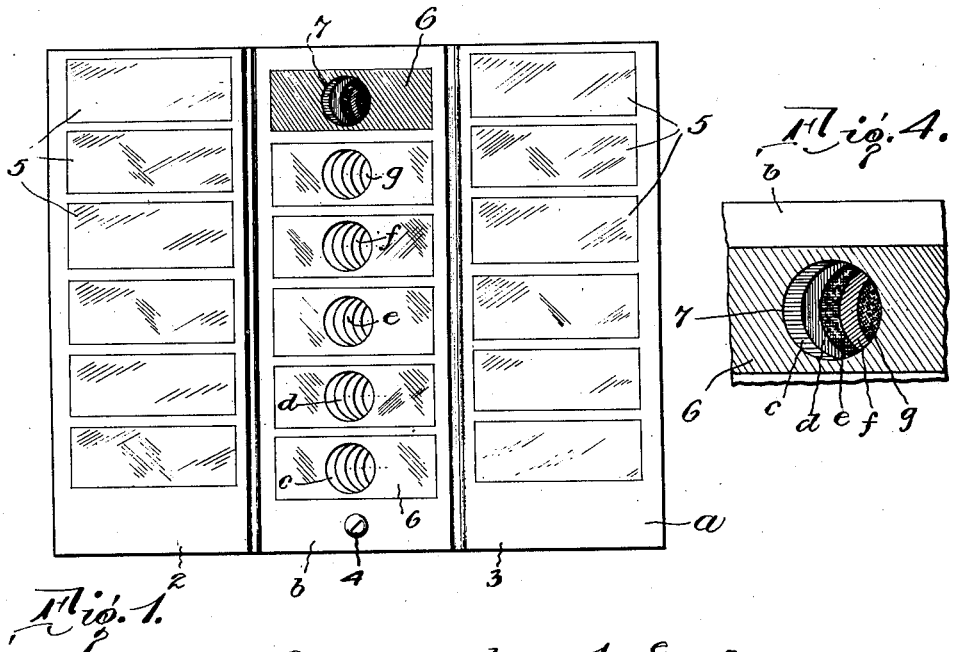
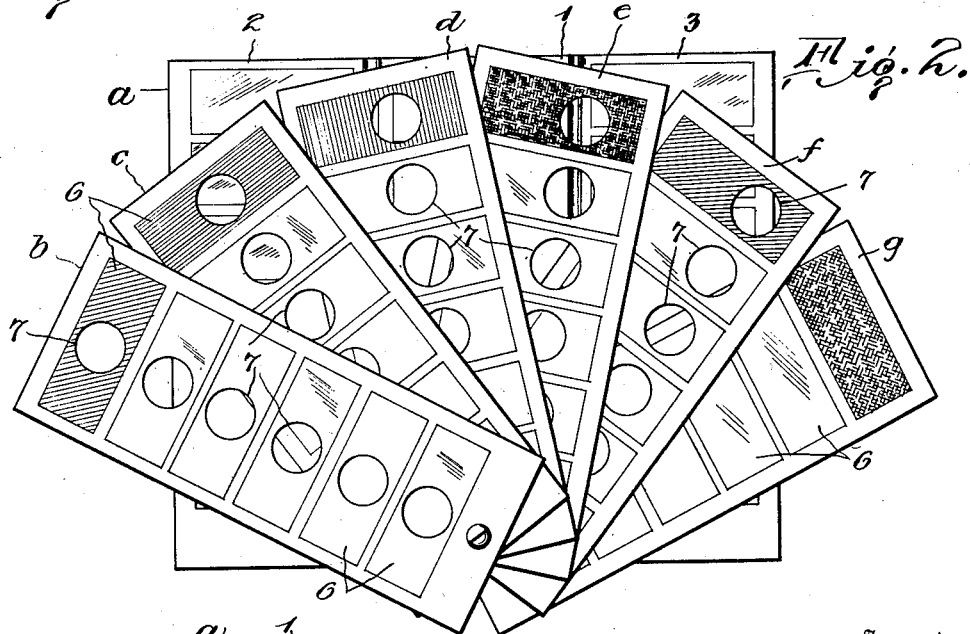
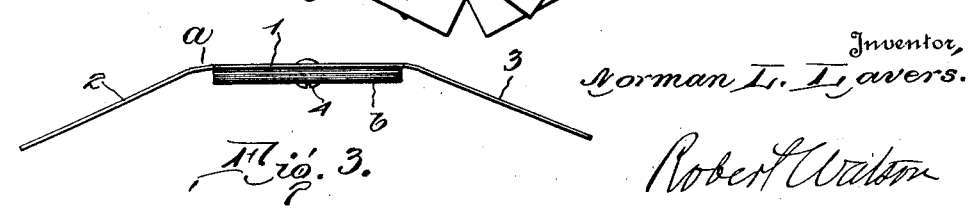
Inventor,
Norman L. Lavers.
Robert Wilson
Attorney Patented Mar. 3, 1925.

1,528,621

UNITED STATES PATENT OFFICE.

NORMAN L. LAVERS, OF MONTCLAIR, NEW JERSEY, ASSIGNOR TO LEWIS ROBERTS, INC., OF NEWARK, NEW JERSEY, A CORPORATION OF NEW YORK.

COLOR-SAMPLE BOOK.

Application filed April 5, 1923. Serial No. 630,067.

*To all whom it may concern:*

Be it known that I, NORMAN L. LAVERS, a subject of the King of Great Britain, residing at Montclair, in the county of Essex and State of New Jersey, have invented certain new and useful Improvements in Color-Sample Books, of which the following is a specification.

This invention relates to a sample-book for displaying inks and paints of different colors and shades of color. The book comprises a plurality of leaves having panels printed in different colors and shades and secured together near their edges to form a pack, each leaf having sight openings cut through these color panels, and the openings in the several leaves overlapping so as to expose to view, through the openings in the uppermost leaf, portions of the panels adjacent the openings in the successive leaves when the leaves are arranged in a pack. The leaves may each have a single color panel or a plurality of color panels, and the number of leaves may vary according to the number of colors to be exhibited. When the book is opened, a large number of colors are exposed to view through the openings, and if it is desired to examine the colors on the individual panels more closely, the leaves may be moved apart so as to uncover the panels.

In the accompanying drawing,

Fig. 1 is a front view of the sample-book with the covers in open position and the leaves registering with one another;

Fig. 2 is a front view of the book with the leaves spread apart;

Fig. 3 is an end view of the book; and

Fig. 4 is a detail view showing superposed panel portions of the leaves on a larger scale.

Referring to the drawing, $a$ represents the cover of the book, comprising a back piece 1 and two cover pieces 2 and 3, connected to the back piece by flexible hinges and adapted to fold over the back piece to enclose the leaves $b$, $c$, $d$, etc. The leaves are approximately of the same length and width as the back piece and are attached to one end of the back piece by a pin or stud 4, which passes through perforations in the ends of the leaves. The leaves lie in a pack, as shown in Fig. 1, when the book is closed, and may be spread out, as illustrated in Fig. 2, when the book is open. The book is relatively long and narrow so that it may be conveniently carried in a coat pocket.

The book is intended particularly as a sample book for displaying inks, and it will be described for that purpose although it may be used for displaying paints. The inner sides of the covers are printed with inks of various colors, in panels, as shown at 5, and the leaves are likewise printed with inks of various colors and shades, in panels, as shown at 6. Thus, in the drawing, I have shown six color panels on each leaf, and the panels on the several leaves are arranged in corresponding positions so that when the leaves are in register, the correspondingly located panels on the successive leaves will be in register. Six leaves are shown in the drawing, for the purpose of illustration, and with six panels on a leaf, thirty-six colors or shades of colors may be shown; but the number of leaves as well as the number of panels may be varied, as desired.

The sample-book thus far described is old in the art. My improvement consists in providing in each of the leaves except the last one, $g$, in the series, sight openings 7 which are cut through the color panels, these openings being arranged so that when the leaves are in register with one another, as shown in Fig. 1, the margins of the openings in the successive leaves will be out of register and will overlap one another, as illustrated in Figs. 1 and 4. With this arrangement of sight openings, portions of the color panels in all of the leaves succeeding the first leaf $b$ will be displayed through sight openings in the first leaf when the leaves register with one another. Thus, all of the colors on the successive leaves will be exposed to view upon opening the covers of the book.

Preferably, the sight openings in the panels are circular in form and of uniform size, but the forms and sizes of the openings may vary, as well as the number of leaves and the number of panels on a leaf, the essential feature of the invention being the arrangement of the openings in the panels so that the margins of the openings in the successive leaves will overlap and expose to view, through the opening or openings in the first leaf, portions of the panels in all the successive leaves of the book. In the drawing, the circular openings shown are of uniform size, and are stepped uniformdistances to the right, in the successive leaves, thus showing, through the opening in the first leaf, crescent-shaped portions of the panels of the successive leaves down to the last leaf, g, in the series, which is not perforated and which shows a part having the outline of a double convex lens. If it is desired to examine more extended portions of the panels than are exposed through the sight openings, the leaves may be spread as shown in Fig. 2.

What I claim is:

1. A color sample-book comprising a series of pivotally connected superposed leaves, each leaf having a color panel thereon and each leaf having a sight-opening cut through its color panel, the openings in the several leaves overlapping so as to expose to view, through the opening in the uppermost leaf, portions of the panels adjacent the openings in the successive leaves.

2. A color sample-book comprising a series of pivotally connected superposed leaves, each leaf having a color panel thereon and each leaf having a circular sight-opening cut through its color panel, the openings in the several leaves overlapping so as to expose to view, through the opening in the uppermost leaf, portions of the panels adjacent the openings in the successive leaves.

3. A color sample-book comprising a series of superposed leaves each having a color panel thereon and each leaf having a sight-opening cut through its color panel, the openings in the several leaves being of the same size and form, the openings in the several leaves overlapping so as to expose to view, through the opening in the uppermost leaf, portions of the panels adjacent the openings in the successive leaves.

4. A color sample-book comprising a series of superposed leaves, each having a plurality of color panels thereon and each leaf having a sight-opening cut through each of several of its panels, the openings in the several leaves overlapping so as to expose to view, through the openings in the uppermost leaf, portions of the panels adjacent the openings in the successive leaves.

5. A color sample-book comprising a series of superposed leaves, each having a plurality of color panels thereon and each leaf having a sight opening cut through each of several of its panels, the openings in the several leaves being of the same size and form and overlapping so as to expose to view, through the openings in the uppermost leaf, portions of the panels adjacent the openings in the successive leaves.

6. A color sample-book comprising a series of superposed leaves of uniform size pivotally connected together near one margin, each leaf having a plurality of color panels thereon and each leaf having sight openings cut through its several panels, the openings in the several leaves overlapping so as to expose to view, through the openings in the uppermost leaf, portions of the panels adjacent the openings in the successive leaves.

In testimony whereof I hereunto affix my signature.

NORMAN L. LAVERS.